United States Patent [19]
Holmes

[11] 3,743,364
[45] July 3, 1973

[54] VALVE
[75] Inventor: Alton B. Holmes, Troy, Mich.
[73] Assignee: North American Rockwell Corporation, Pittsburgh, Pa.
[22] Filed: Jan. 3, 1972
[21] Appl. No.: 214,768

[52] U.S. Cl.................................. 303/54, 137/107
[51] Int. Cl............................................ B60t 15/12
[58] Field of Search...................... 303/52, 54, 40; 137/107

[56] References Cited
UNITED STATES PATENTS
3,613,710 10/1971 Oberthur....................... 303/40 X
3,443,841 5/1969 Kobnick........................ 303/40 X
3,665,950 5/1972 Nelson.......................... 137/107
3,525,555 8/1970 Meyer et al.................... 303/40

Primary Examiner—Allen N. Knowles
Assistant Examiner—Gene A. Church
Attorney—John R. Bronaugh et al.

[57] ABSTRACT

Control valve for selectively connecting an outlet passage to a source of fluid under pressure or to exhaust, the action of the valve being controlled by regulation of the fluid pressure in a control chamber selectively vented or connected to a source of fluid under pressure by a solenoid operated control valve.

8 Claims, 6 Drawing Figures

PATENTED JUL 3 1973

VALVE

BACKGROUND OF THE INVENTION

The valve of the present invention has particular utility in the control of air pressure supplied to vehicle brake actuators as a part of an anti-skid brake control system. In such systems an electrical signal is generated in response to an actual or incipient skid condition, the signal being used to control a valve interposed between the source of the operator applied pressure and the brake actuator.

In prior systems the anti-skid valves have been effective to release the brakes, to pulse the brakes or to otherwise modulate the brake pressure.

With the advent of control systems of increased sophistication the need has arisen for valves having greater versatility and flexibility and increased speed of response, and which are effective reliably to provide, at the brake actuators, the pressure which the control system has determined to be required to provide the necessary braking action.

SUMMARY OF THE INVENTION

It is the principal purpose and object of the present invention to provide improved control valves, particularly for use in anti-skid pneumatic brake systems which have increased versatility and are capable of rapidly establishing at the brake actuators any pressure required by the control system while permitting normal brake operation in the absence of an anti-skid signal.

It is a further object of the present invention to provide improved control valves of this type which are of compact construction, which provide increased reliability, and which have a high resistance to damage or deterioration when subjected to the unfavorable environmental condition in which such valves are required to operate.

In attaining these and other objects, the present invention provides a valve adapted to be interposed in the main brake service line connecting the usual service reservoir, containing air under pressure, and the brake actuators. The valve is normally closed and is opened by displacement of a diaphragm or other pressure sensitive device, one side of the diaphragm being exposed to the pressure at the brake actuators and the opposite side being exposed to the pressure in a control chamber.

Pressure is selectively supplied to the control chamber by the usual operator controlled treadle valve. The pressure delivered to the control chamber from the treadle valve is modified by the action of a control valve which, in a first limit position, permits the development in the control chamber of full pressure signalled by the operator through the treadle valve, and in a second limit position blocks the inlet port from the treadle valve and vents the control chamber to atmosphere.

The control valve is spring biased to the first limit position and is moved toward the second limit position by a solenoid which receives a signal from an electric anti-skid control system when actual or incipient skid conditions are detected. If the signal is such that the solenoid is energized continuously, the control valve will reduce the pressure in the control chamber to zero, thus releasing the brakes. If the signal is such that the solenoid is rapidly cycled on and off, the control valve will be moved back and forth between its limit positions whereby the control chamber is alternately connected to the inlet from the treadle valve and the vent, thus establishing an intermediate pressure in the control chamber, and consequently establishing an intermediate pressure at the brake chambers. The level of the intermediate pressure can be selected by control of the on-off time of the solenoid.

Additional advantages and objects will become apparent as the description proceeds.

THE DRAWINGS

Figure 1:
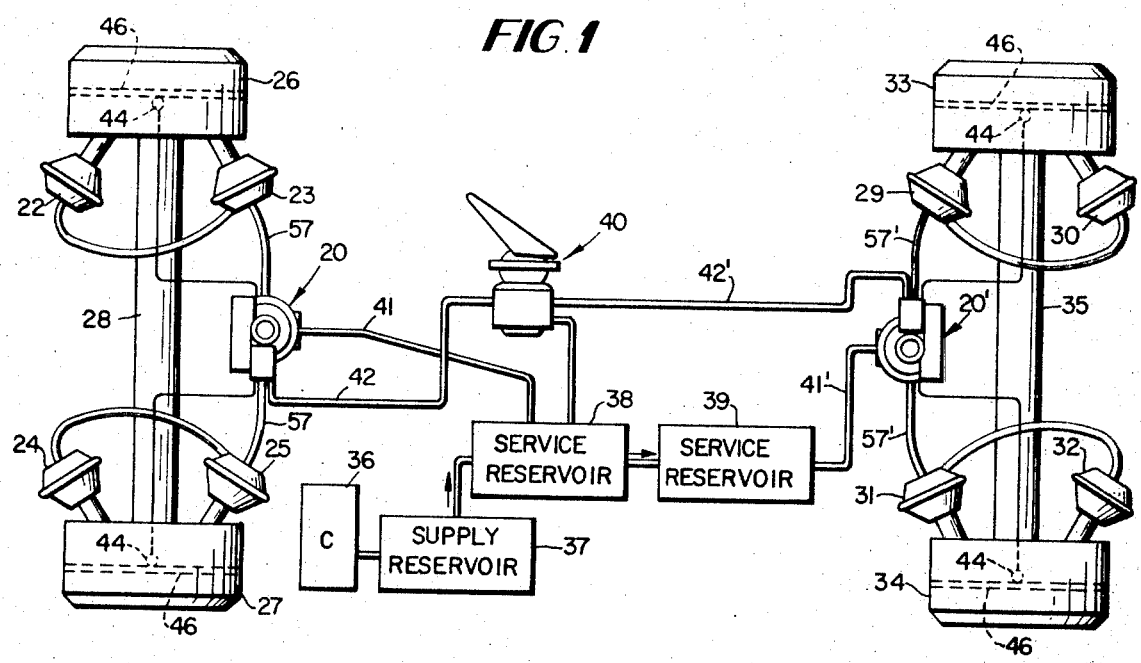
FIG. 1 is a diagrammatic illustration of a typical installation of the control valve of the present invention.

Referring now more particularly to FIG. 1, the control valve of the present invention is preferably utilized to control the brakes on all wheels mounted on one axle. In the illustrated embodiment, one of the control valves, indicated generally at 20, controls the operation of the paired actuators 22–23 and 24–25 associated with brake mechanisms 26 and 27 of the wheels on the front axle 28. An identical control valve 20' controls the paired actuators 29–30 and 31–32 associated with the brake mechanisms 33 and 34 on the rear vehicle axle 35.

The remainder of the brake system, which is essentially conventional, includes the usual compressor 36 which delivers air under pressure to a supply reservoir 37 and thence to series connected service reservoirs 38 and 39, the former being connected to supply air under service pressure, for example, 100 psi, through line 41 to the control valve 20 associated with the front axle and the latter being connected to supply service air through line 41' to the control valve 20' associated with the rear axle.

The service reservoir 38 is also connected to supply air under pressure to the usual treadle valve 40. When the operator depresses the treadle valve 40, air under the selected pressure is delivered to the control chambers of the control valves 20 and 20' through lines 42 and 42', respectively, as explained in detail below. When the treadle valve is released it vents the pressure in the control chamber.

The electrical control system, which controls the action of the valves 20 and 20', includes sensors 44 mounted on the axles 28 and 35 adjacent notched discs 46 rotatable with each of the wheels, the sensors 44 generating signals indicative of the angular velocity of the wheels. These signals from the sensors 44 for each axle are supplied to a computer unit carried by the housing of the valves 20 and 20' for that axle. The velocity signals are processed and under certain conditions actuate the valves to modify the brake pressure applied by the operator through the treadle valve 40 in a manner explained in greater detail below.

Figure 2:
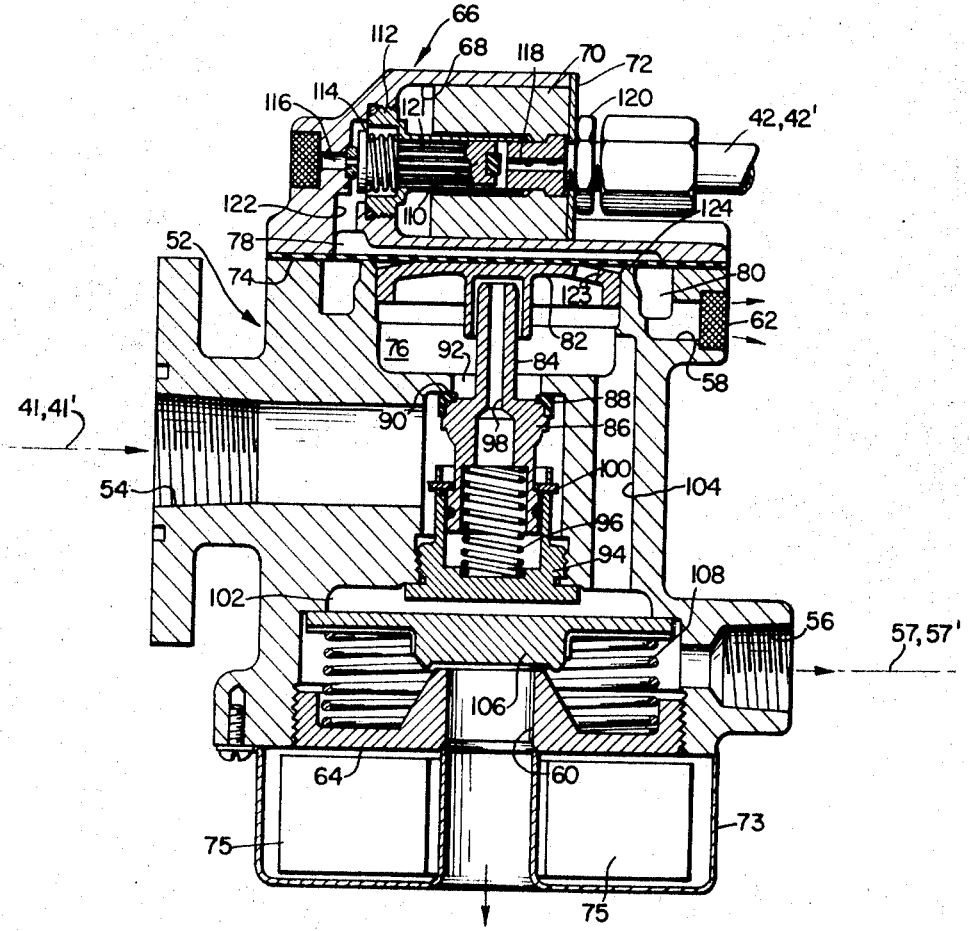
FIG. 2 is a central vertical section illustrating details of construction of one embodiment of the valve of the present invention.

Referring now more particularly to FIG. 2, the valve assembly 20 includes a main generally cylindrical body member 52 having an inlet opening 54 to which air is supplied from the reservoirs 38 or 39 through line 41 or 41' and having one or more outlet openings 56 (one shown) for supplying air to the brake actuators through the lines 57 or 57'. The housing also has a pair of vent openings 58 and 60, the former covered by a filter 62 and the latter being formed in a fitting 64 threaded into the base of the main housing 52.

Secured to the upper end of the main housing 52 by a plurality of bolts (not shown) is an upper housing 66 having a laterally extending cavity 68 which houses a solenoid coil 70 and is closed by an end cover plate 72. A housing 73 detachably secured to the lower end of main housing 52 encloses and supports a computer 75 which processes the signals from the sensors 44 and controls the solenoid 70.

Clamped between the main housing 52 and the upper housing 66 is a flexible diaphragm 74 which separates the main flow chamber 76 in the housing 52 from a control chamber 78 in the upper housing 66. The diaphragm 74 also acts as a valve member selectively connecting and disconnecting the flow chamber 76 and an annular chamber 80 communicating with the vent passage 58.

The lower surface of diaphragm 74 is supported on the upper surface of a piston 82 mounted for limited vertical reciprocation in the flow chamber 76. The piston 82 is slidably mounted on the upper end of a stem 84, the lower portion of which carries a valve member 86 having an annular sealing member 88 adapted to engage an annular seat 90 to selectively open and close a passage 92 connecting the inlet 54 with the flow chamber 76.

The lower portion of the valve member 86 is slidably received in a fitting 94 threaded into the valve body 52. A spring 96 compressed between the fitting 94 and the valve 86 urges the latter toward closed position. To permit free movement of the valve 86 in the fitting 94, the internal space between the parts is vented through a stem passage 98. To facilitate installation and removal of the fitting and valve body 86 as a unit the parts are preferably held in assembled relation by a lock ring 100.

The flow chamber 76 is connected to a quick release valve chamber 102 through a passage 104. A quick release valve assembly comprises a valve plate 106 urged by spring 108 to the position shown to open the vent passage 60, thus venting the brake actuators. When the brakes are applied, the pressure developed in chambers 76 and 102 moves the valve plate 106 downwardly from the position shown to close the vent opening 60 and permit free communication between the flow chamber 76 and the brake actuators.

Figure 3:
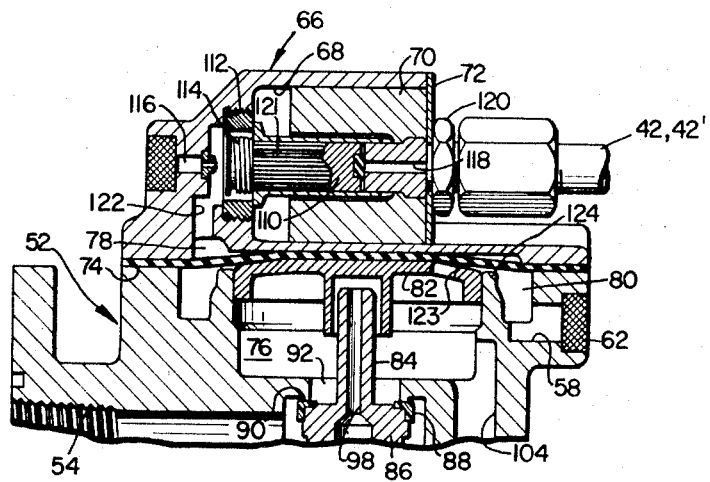
FIG. 3 is a fragmentary section showing components of the valve of FIG. 2 in a different operating position.

The pressure in control chamber 78 is regulated by a shuttle valve or plunger 110 slidably received in a fitting 112, an extension of which passes through the central aperture of the solenoid coil 70. The shuttle valve 110 is normally biased to the left by spring 114 to close a vent port 116 as shown in FIG. 2. When the shuttle valve is in this position air from the treadle valve 40 passes through a central aperture 118 in fitting 120 and along flutes 121 in the valve plunger 110 into passage 122, then into the control chamber 78. When the solenoid 70 is energized the valve plunger 110 is magnetically attracted and thus moves to its opposite limit position, closing the end of passage 118 and connecting the control chamber 78 to the atmosphere through the passage 122 and the vent port 116 as shown in FIG. 3.

The valve is shown in FIG. 2 in its brake OFF position. Air under full service pressure, for example, 100 psi, is supplied to the upstream side of the valve 86, which maintains the port or passage 92 closed because of the pressure differential across the valve augmented by the action of the spring 96. Accordingly, all other portions of the valve are under essentially atmospheric pressure and the brakes are fully released. When the operator actuates the treadle valve 40, air under pressure determined by the operator selected position of the treadle valve is supplied through line 42 or 42' to the control chamber 78. The establishment of the selected pressure in the control chamber 78 depresses diaphragm 74 and piston 82 to open valve 86, permitting air to flow from the inlet port 54 through the port 92 and the passage 104 to move the valve plate 106 downwardly to its seated position permitting the passage of air through the port 56 to the brake actuators. At this time the pressure differential across the diaphragm also maintains the annular exhaust chamber 80 isolated from the flow chamber 76.

As soon as the brakes are seated the pressure in the brake line and the flow chamber 76 rapidly increases until the pressure differential across the diaphragm 74 is eliminated thus restoring the piston 82 and the diaphragm to their original neutral or balanced positions, permitting valve 86 to close, thus establishing the pressure at the brake actuators in accordance with that selected by the operator. When the operator releases the treadle valve 40 the pressure in the supply lines 42, 42' and the pressure in control chamber 78 is reduced to atmospheric. The pressure in flow chamber 76 is supplied to the underside of the diaphragm 74 through one or more vent openings 123 which lifts the diaphragm off the annular seat 124 to connect the control chamber and the space above the valve plate 106 to atmosphere through the vent port 58 as shown in FIG. 3. The valve plate 106 is immediately lifted from its seat by spring 108, venting the brake actuators.

The operation of the valve thus far described assumes that the operator did not supply sufficient brake pressure to cause the wheels to exceed acceptable slip. When excessive slip occurs, the control system (including sensors 44 and computer 75) with which the valve is associated generates two types of signals. The first signal calls for complete brake release to permit the wheels to regain synchronous speed. The control system also generates signals calling for partial brake application pressure after the wheels begin to accelerate. The brake OFF signal energizes the solenoid 70 and maintains the solenoid energized so long as the signal persists. The partial brake pressure signal, on the other hand, rapidly cycles the solenoid on and off.

When the brakes are applied initially the valve will function in the manner thus far described until the brake OFF signal is generated. When this occurs, the energization of the solenoid 70 will shift the plunger 110 to the right, (FIG. 3) closing the inner end of port 118 and opening the vent port 116. This reduces the pressure in control chamber 78 essentially to atmospheric pressure and the consequent action of the valve is the same as if the treadle valve had been released, producing essentially immediate release of the brakes.

If the brake OFF signal is discontinued, the solenoid 70 is deenergized, permitting the plunger 110 to move to the left as viewed in FIG. 2 under the influence of fluid pressure differential and force of the spring 114, closing the vent port 116, opening the inlet port 118 and permitting the development in the control chamber 78 of the pressure signalled by the vehicle operator, thus again placing the brakes under full operator control.

Usually the control system is effective, upon the detection of an actual or incipient skid condition, to produce a signal calling for brake release followed by a signal calling for partial brake application at a preselected level or a series of preselected levels. The signal is such as to control the duty cycle of the solenoid 70. More specifically, the signal controls the ratio of solenoid ON time to solenoid OFF time in a series of relatively short discrete time intervals. In a typical case the basic cycle time is 40 msec. To establish the desired level of brake pressure the control system energizes the solenoid 70 during a predetermined fraction of each 40 msec period. As the ratio of On time to OFF time in each cycle period is increased the brake pressure is reduced.

The rapid cycling of the solenoid places the plunger 110 in what may be called a "dithering" mode, in which the plunger rapidly moves between the limit positions shown in FIGS. 2 and 3 in which the control chamber 78 is connected to pressure and to exhaust, respectively.

Figure 6:
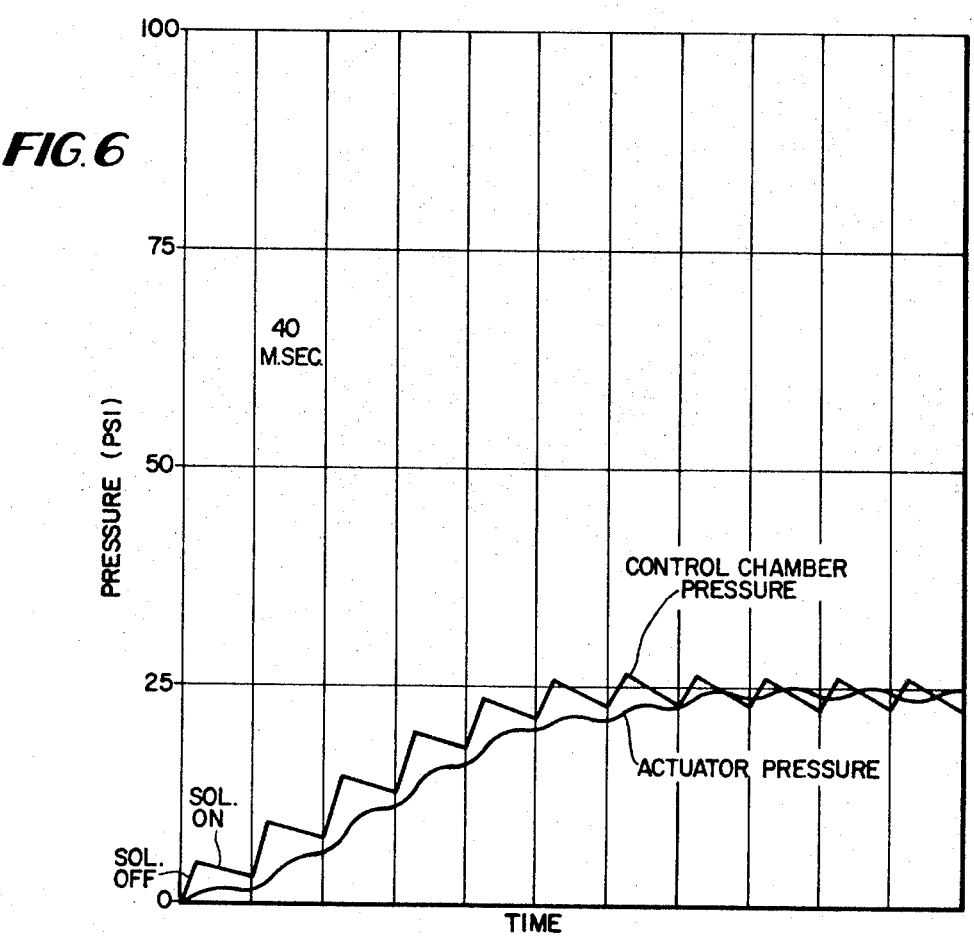
FIG. 6 is a chart illustrating time - pressure curves under typical conditions.

The performance of the control valve under these conditions is illustrated by the graph FIG. 6. In this example it is assumed that a brake OFF signal has been generated reducing the pressure in control chamber 78 and the pressure in the brake actuators essentially to atmospheric, that the service pressure supplied to the inlet port 118 through the lines 42 or 42' is 100 psi and that it is desired to establish a duty cycle for the solenoid 70 such that the ratio of ON time to OFF time is 3:1, that is, OFF time is 25 percent of the total cycle time.

In the first 40 msec interval the pressure in control chamber 78 will rise relatively rapidly because of the high pressure differential between the pressure existing at inlet opening 118 and the pressure then existing in control chamber 78. During the solenoid ON time the control chamber 78 is vented but the pressure decay rate is relatively small because of the relatively low pressure differential between the control chamber and the atmosphere. In the succeeding cycles the rate of pressure increase during each solenoid OFF period will decrease and the rate of pressure decay during each solenoid ON period will decrease. As the pressure differential between the inlet opening 118 and the control chamber decreases and the pressure differential between the pressure in the control chamber 78 and atmosphere increases, eventually the pressure in control chamber will reach equilibrium value at approximately 25 psi. The pressure in flow chamber 76 and the pressure to brake actuators will follow the pressure in control chamber 78 as explained above.

It will be apparent that by increasing the ratio of ON time to OFF time the system will reach equilibrium at a lower pressure and conversely by decreasing the ratio of ON time to OFF time the system will reach equilibrium at a higher pressure.

Figure 5:
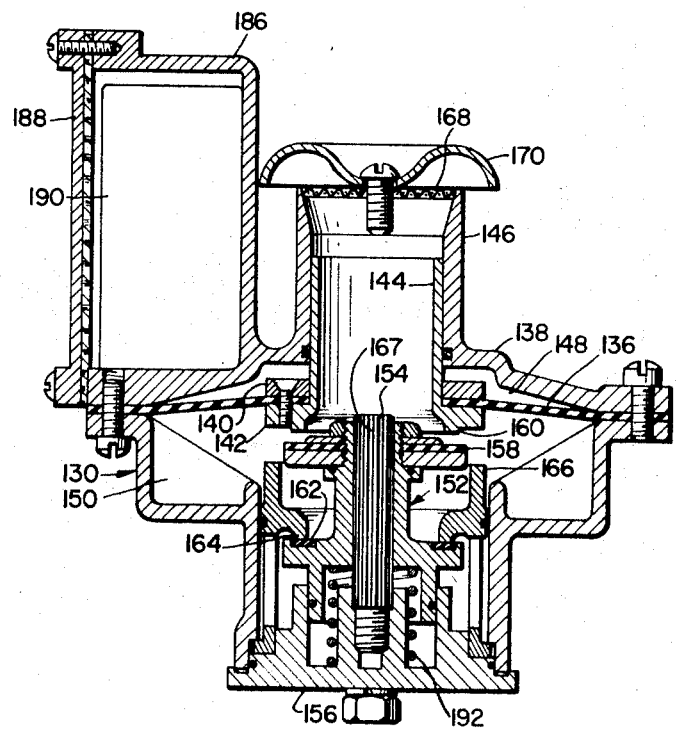
FIG. 5 is a vertical section rotated 90° from the section of FIG. 4 and showing components of the valve in a different operating position.
Figure 4:
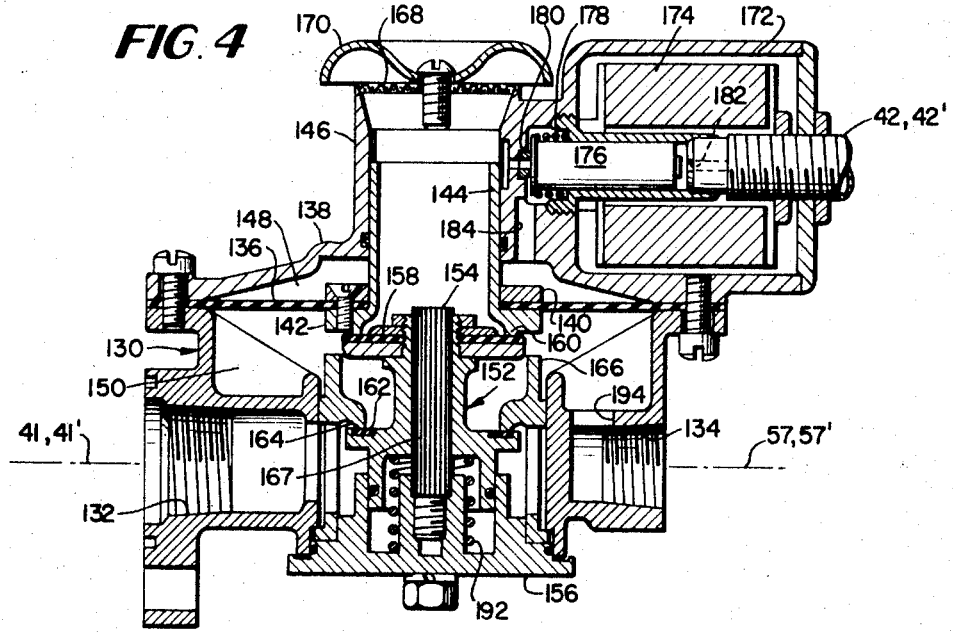
FIG. 4 is a vertical section showing details of another embodiment of the valve of the present invention.

FIGS. 4 and 5, to which detailed reference will now be made, illustrate another embodiment of the valve in accordance with the present invention, the action of which is essentially the same as the action of the embodiment described above.

The main valve body 130 has an inlet opening 132 for connection to the service reservoirs 38 or 39 through line 41 or 41' and an outlet opening 134 connected to the brake actuators through lines 57 or 57'. The periphery of a diaghragm 136 is clamped between the upper surface of the body 130 and a top cover 138. The inner periphery of the diaphragm is clamped between a retainer ring 140 and an annular flange 142 on a sleeve 144 received for vertical reciprocation in a cylindrical boss 146 formed integrally with the top cover 138. The diaphragm 136 divides the valve into a control chamber 148 and a flow chamber 150.

A double valve assembly 152 is mounted for vertical reciprocation on a fixed stem 154 carried by a bottom cover plate 156 suitably secured to the valve body 130. The valve has an upper seal 158 adapted to engage an annular seat 160 formed on the sleeve 144 and a lower seal 162 adapted to engage an annular seat 164 formed on a sleeve 166, the lower end of which is clamped against the body 130 by the bottom cover plate 156.

The stem 154 has a series of longitudinally extending flutes or serrations 167 to connect the space below the valve assembly 152 with the interior of the sleeve 144 and the boss 146, the upper end of which is vented to the atmosphere through a filter 168 and a protective cover plate 170.

The cover plate 138 is provided with a laterally projecting housing 172 containing a solenoid 174 and a plunger 176 which is biased by spring 178 to the position shown to block a vent port 180 leading to the interior of the boss 146 and to permit the flow of air under pressure from the treadle valve through inlet port 182 and passage 184 into the control chamber 148.

When the solenoid 174 is energized the plunger 176 moves to its opposite limit position to block the inlet port 182 and connect the control chamber to atmosphere through the port 180 as in the previously described embodiment.

As shown in FIG. 5 the cover 138 is provided with a second housing 186 circumferentially spaced from the housing 172. The housing 186 which is closed by a removable cover plate 188 houses the computer 190 which receives the signals from the sensors 44 and controls the solenoid 174.

The valve is illustrated in FIG. 4 in the brake OFF position. The flow of air under pressure into the valve is blocked by the engagement of seal 162 with the seat 164. The flow chamber 150 and the control chamber 148 are under atmospheric pressure. During normal brake application air under pressure is transmitted through the treadle valve 40 directly to the control chamber through lines 42 or 42' to inlet passage 182 and passage 184. The pressure differential across the diaphragm 136 will depress the diaphragm tightly engaging seal 158 and seat 160 moving the valve assembly 152 downwardly against the action of spring 142 to permit air under pressure to enter flow chamber 150 and pass through the opening 194 and through the outlet port 134 to the brake actuators. As soon as the pressure in the flow chamber 150 equals the pressure in the control chamber 148 the components of the valve will resume the neutral or balanced position shown in FIG. 4. When the operator discontinues the application of brakes at the treadle valve 40, the pressure in the control chamber 148 is rapidly reduced to atmospheric and the resulting upwardly acting pressure differential across the diaphram 136 will lift the diaphragm and move the valve seat 160 away from side 158 as shown in FIG. 5, thus connecting chamber 150, port 134 and the brake actuators to exhaust through the passage in the boss 146.

The action of the solenoid 174 in releasing the brakes when energized or in establishing a partial brake pressure when cyclically energized and deenergized is the same as in the previously described embodiment.

I claim:

1. A valve assembly comprising a body having an inlet passage for connection to a source of fluid under pressure, an outlet passage for selective connection to a pressure actuated device or to a vent passage, a first normally closed valve for selectively connecting said inlet and outlet passages, a second normally closed valve for selectively connecting said outlet passage to said vent, and a pressure responsive member, operable when displaced in one direction from a neutral position, to open said first valve without opening said second valve and operable, when displaced in the other direction from said neutral position, to open said second valve without opening said first valve.

2. The combination according to claim 1, together with means forming a control chamber at one side of said pressure responsive device, said control chamber having an inlet for connection to a source of fluid under pressure and a vent port; a third valve movable between a first position to open said inlet and close said vent port and a second position to close said inlet and open said vent port, and means for controlling the position of said third valve.

3. The combination according to claim 2 together with means forming a flow chamber at the opposite side of said pressure responsive device between said first and second valves, said flow chamber being connected to said outlet passage whereby said pressure responsive device will occupy said neutral position when the pressure in said flow chamber is in predetermined relation with the pressure in said control chamber.

4. The combination according to claim 2 wherein said last-mentioned means comprises spring means biasing said third valve to said first position and solenoid means operable, when energized, to move said valve to said second position.

5. The combination according to claim 2, together with electrical control means for controlling the energization of said solenoid, and a housing for said electrical control means carried by said body.

6. A modulating valve adapted to be interposed between a pneumatically actuated brake and a source of air under pressure, said valve comprising a body having an inlet passage for connection to said source of air under pressure, an outlet passage for selective connection to said brake or to a vent passage, a first normally closed valve for selectively connecting said inlet and outlet passages to supply air under pressure to said brakes, a second normally closed valve for selectively connecting said outlet passage to said vent to release said brakes, each valve being normally closed, a pressure responsive member, operable when displaced in one direction from a neutral position, to open said first valve without opening said second valve and operable, when displaced in the other direction from said neutral position, to open said second valve without opening said first valve, means forming a control chamber at one side of said pressure responsive device, said control chamber having an inlet for connection to an operator controlled source of air under pressure and a vent port, a third valve movable between a first position to open said inlet and close said vent port and a second position to close said inlet and open said vent port, and means for controlling the position of said third valve.

7. The combination according to claim 2 wherein said inlet and said vent port are disposed at the opposite ends of an elongated passage forming a part of said control chamber and wherein said third valve is axially slidable in and guided by said passage between limit positions adjacent the opposite ends thereof, which limit positions constitute said first and second positions of said third valve.

8. The combination according to claim 7 wherein said third valve position controlling means comprises spring means biasing said valve to said first position and solenoid means surrounding said passage and operable, when energized, to move said third valve to its said second position whereby, in the event of electrical failure, said third valve cannot interfere with the normal pressurization of said control chamber.

* * * * *